US008111797B2

(12) United States Patent
Barnes et al.

(10) Patent No.: US 8,111,797 B2
(45) Date of Patent: Feb. 7, 2012

(54) ENHANCED SYSTEM AND METHOD FOR DETECTING THE LEADING EDGE OF A WAVEFORM

(75) Inventors: Mark A. Barnes, Madison, AL (US); Irina Dodoukh, Huntsville, AL (US)

(73) Assignee: TDC Acquisition Holdings, Inc., Huntsville, AL (US)

(*) Notice: Subject to any disclaimer, the term of this patent is extended or adjusted under 35 U.S.C. 154(b) by 863 days.

(21) Appl. No.: 12/149,785

(22) Filed: May 8, 2008

(65) Prior Publication Data
US 2010/0054304 A1 Mar. 4, 2010

Related U.S. Application Data

(60) Provisional application No. 60/924,301, filed on May 8, 2007.

(51) Int. Cl.
*H04L 25/38* (2006.01)
(52) U.S. Cl. ........ 375/369; 375/368; 375/370; 375/362; 375/130; 370/503; 370/509; 370/512
(58) Field of Classification Search .......... 375/368–370, 375/362, 354, 130; 370/503, 509, 512
See application file for complete search history.

(56) References Cited

U.S. PATENT DOCUMENTS

| | | | |
|---|---|---|---|
| 4,743,906 A | 5/1988 | Fullerton | |
| 5,361,108 A | 11/1994 | Kamata et al. | |
| 5,812,081 A | 9/1998 | Fullerton | |
| 6,111,536 A | 8/2000 | Richards et al. | |
| 6,133,876 A | 10/2000 | Fullerton et al. | |
| 6,177,903 B1 | 1/2001 | Fullerton et al. | |
| 6,218,979 B1 | 4/2001 | Barnes et al. | |
| 6,614,384 B2 | 9/2003 | Hall et al. | |
| 6,762,712 B2 | 7/2004 | Kim | |
| 6,925,109 B2 | 8/2005 | Richards et al. | |
| 6,963,727 B2 | 11/2005 | Shreve | |
| 7,535,983 B2 * | 5/2009 | Paquelet ................... 375/368 |

* cited by examiner

*Primary Examiner* — Phuong Phu
(74) *Attorney, Agent, or Firm* — Venable LLP; Robert S. Babayi; Christopher Ma

(57) ABSTRACT

The present invention is an improved system and method for detecting the leading edge of a waveform. More specifically, the invention relates to detecting the leading edge of an ultra wideband waveform. The invention requires locking to the ultra wideband waveform at a lock reference time, and sampling the ultra wideband waveform during one or more time windows relative to the lock reference time to identify one or more leading edge candidate times based on one or more detection criterion. The ultra wideband signal is sampled at a band limited Nyquist rate that avoids aliasing within a band of interest of the ultra wideband waveform, but allows aliasing outside of the band of interest to minimize the number of samples for leading edge detection processing.

19 Claims, 16 Drawing Sheets

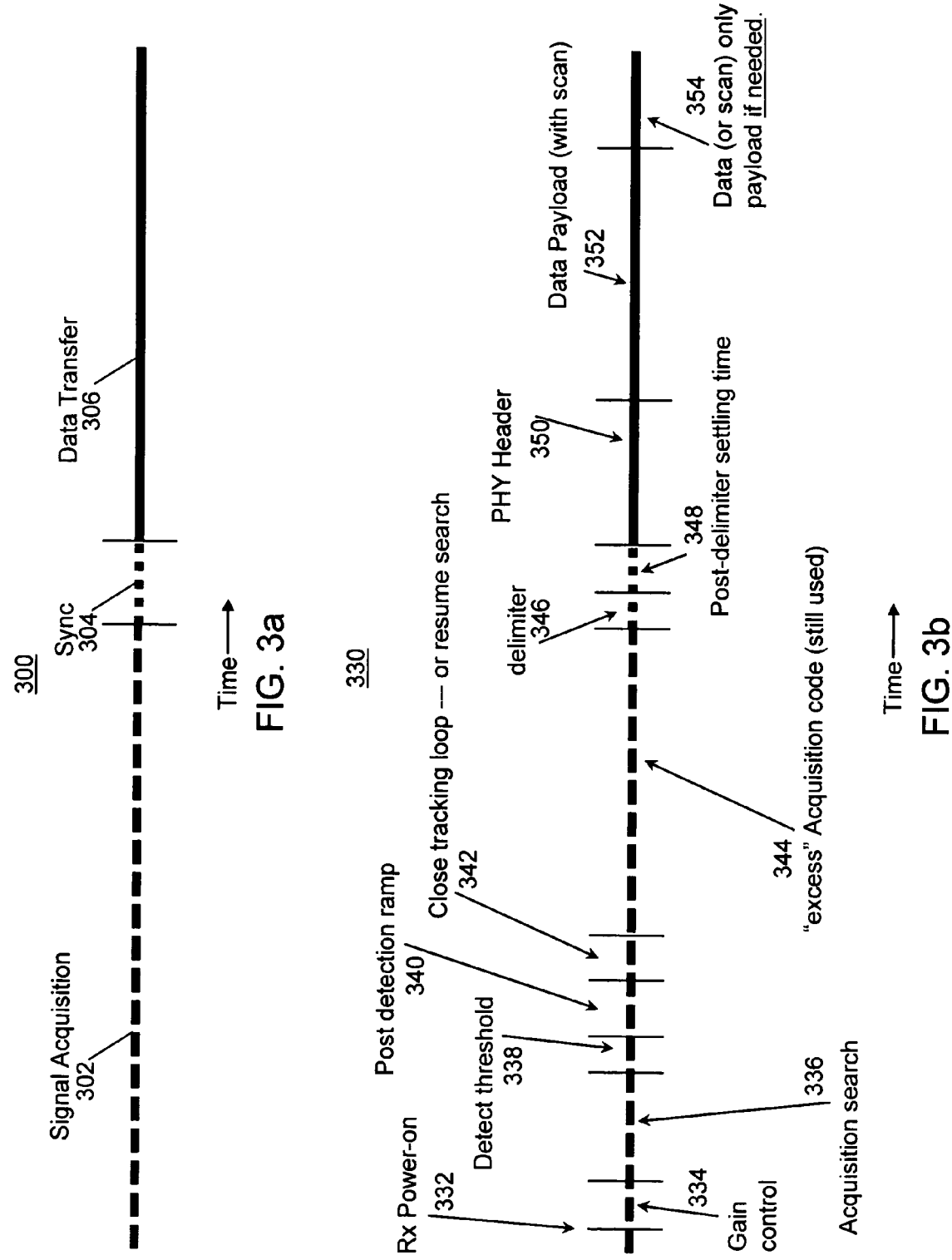

Time-of-Flight = [ $(t_4-t_1) - (t_3-t_2)$ ]/2

Where: $t_3$ takes into account $EC_B = T_{LOCKB} - T_{LEB}$
and $t_4$ takes into account $EC_A = T_{LOCKA} - T_{LEA}$ Time Difference of Arrival = $t_6 - t_5$ Where: $t_5$ takes into account $EC_B = T_{LOCKB} - T_{LEB}$
and $t_6$ takes into account $EC_A = T_{LOCKA} - T_{LEA}$

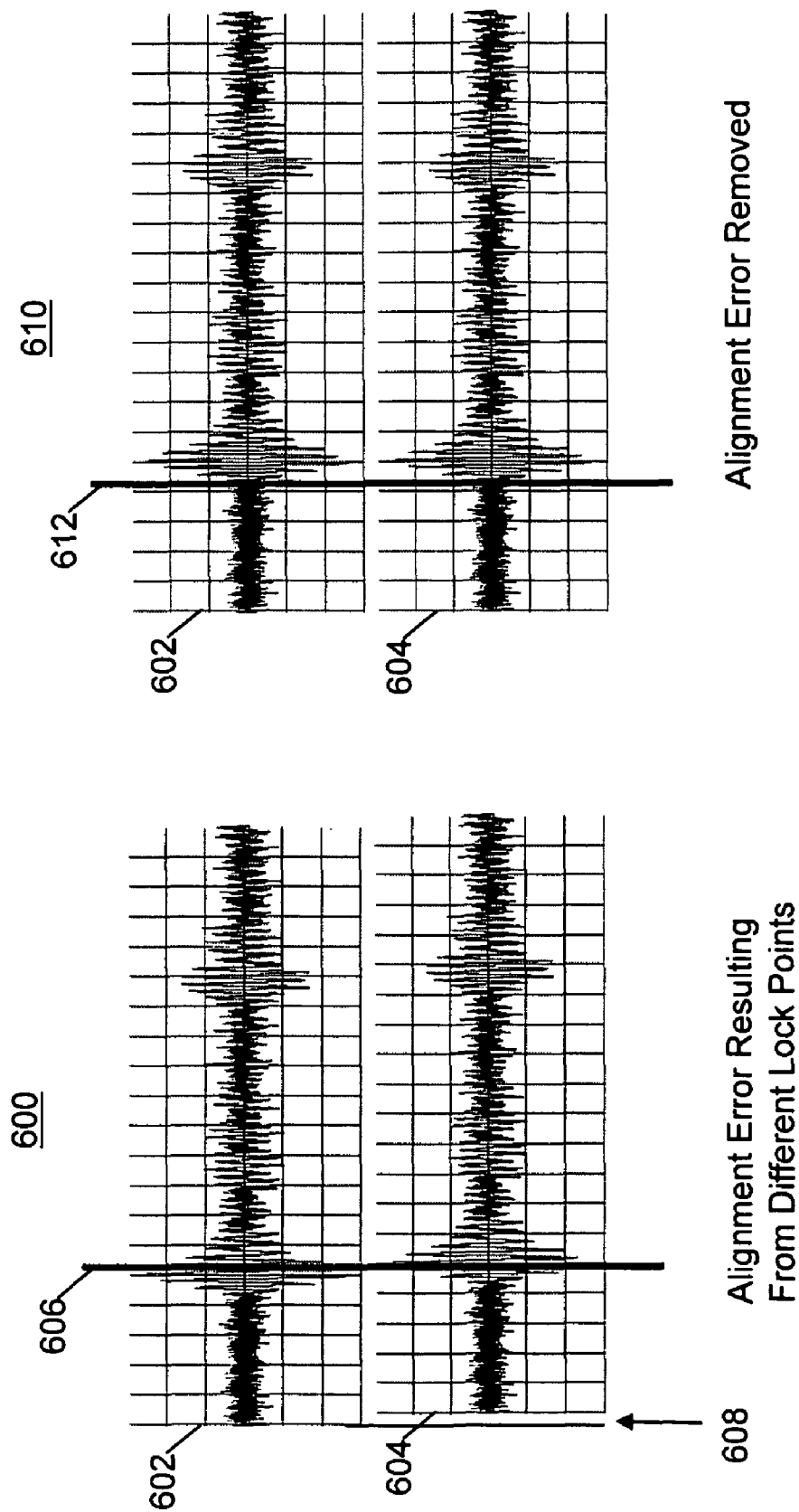

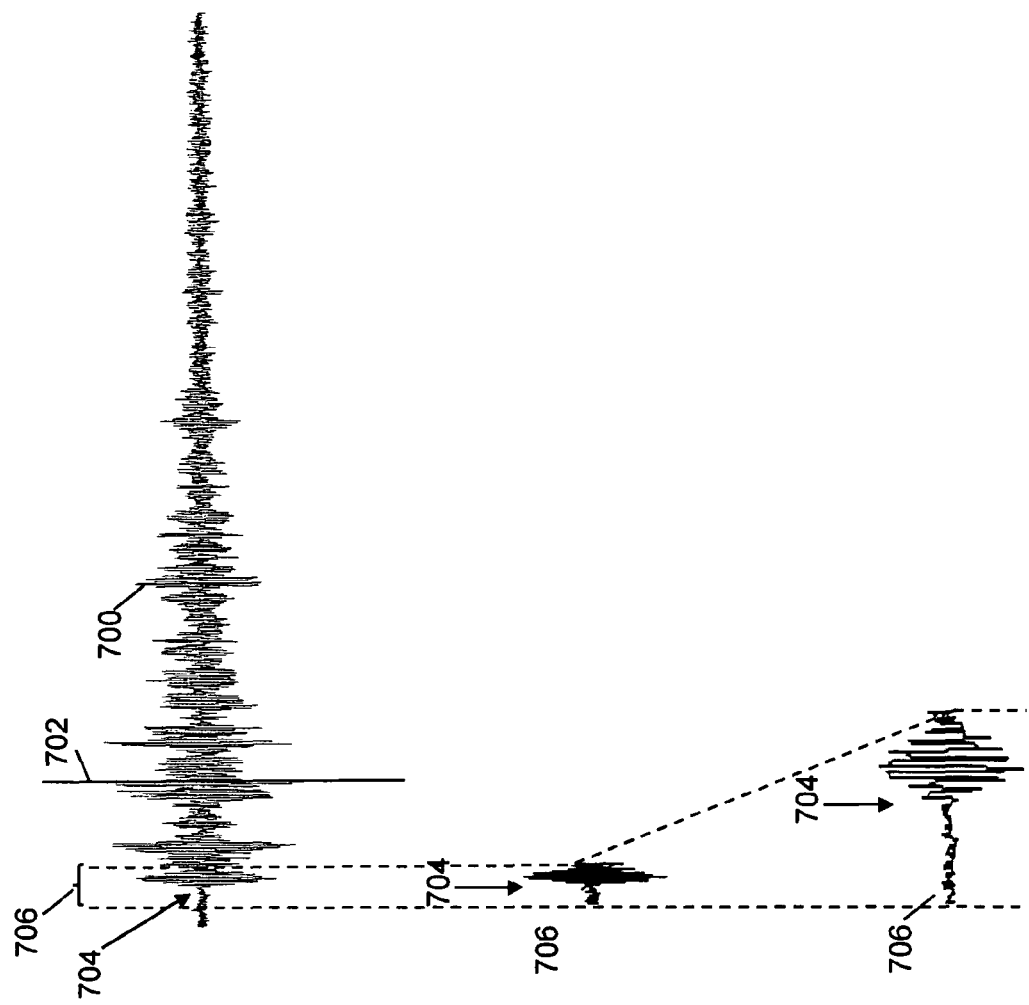

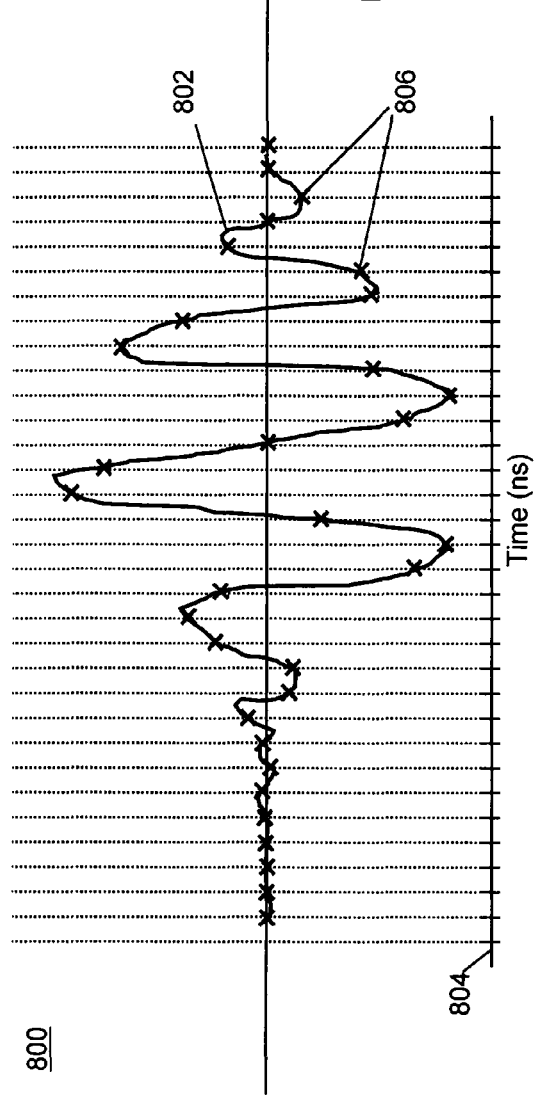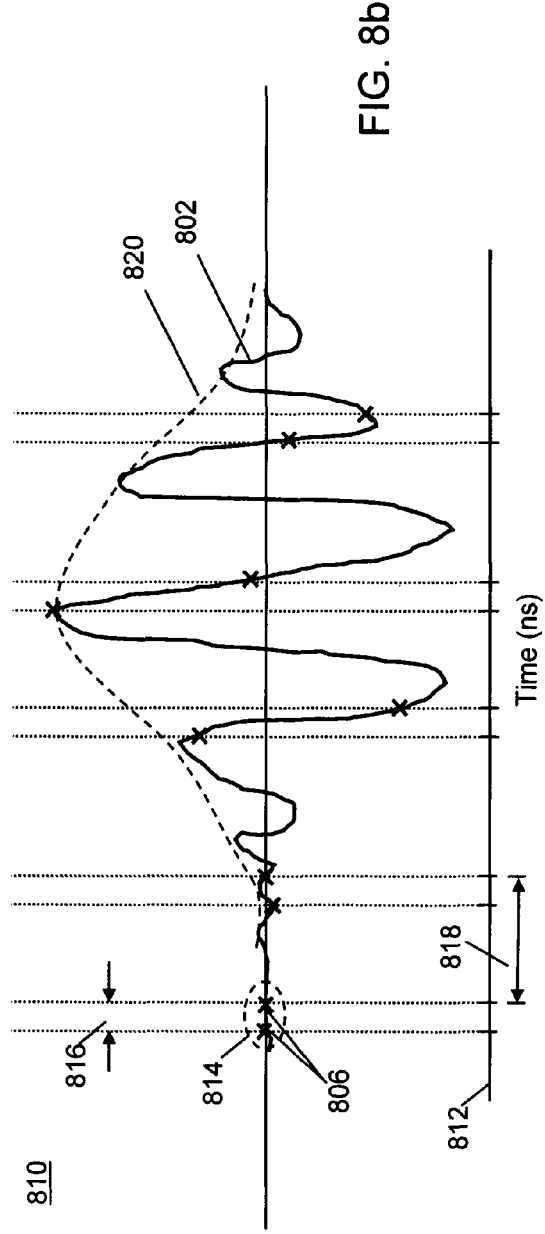

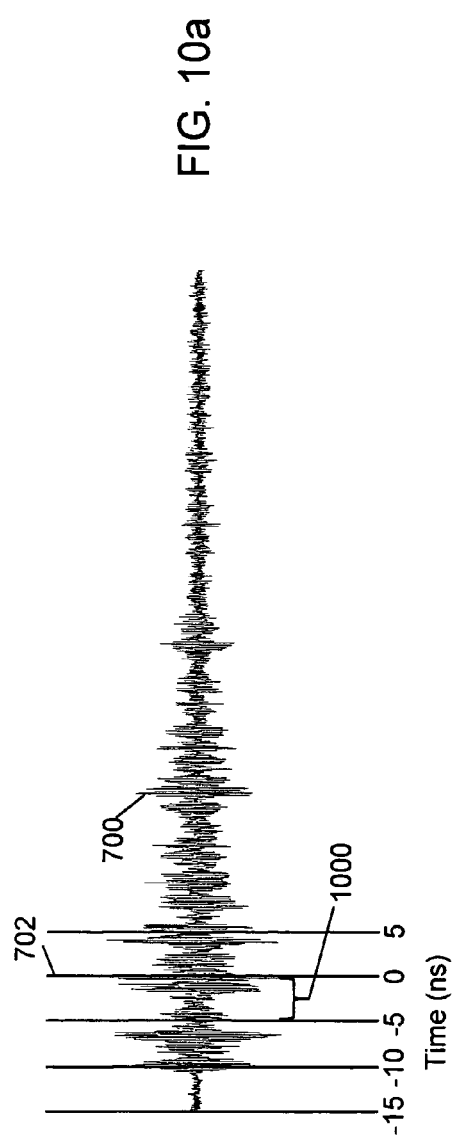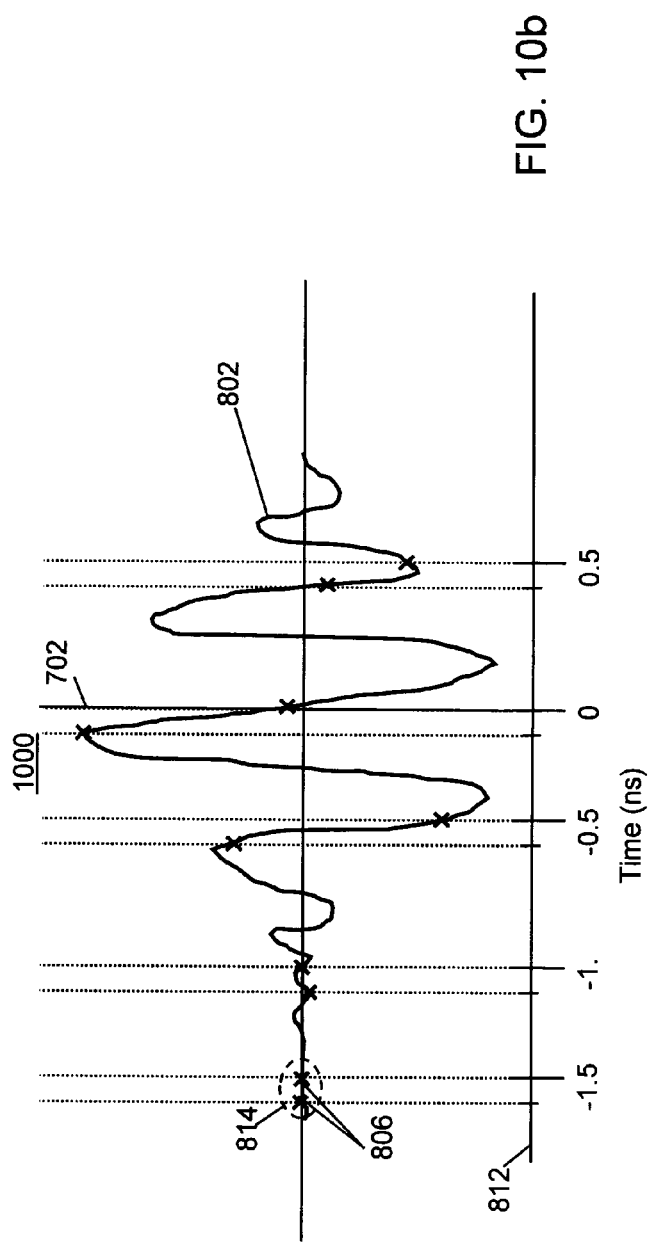

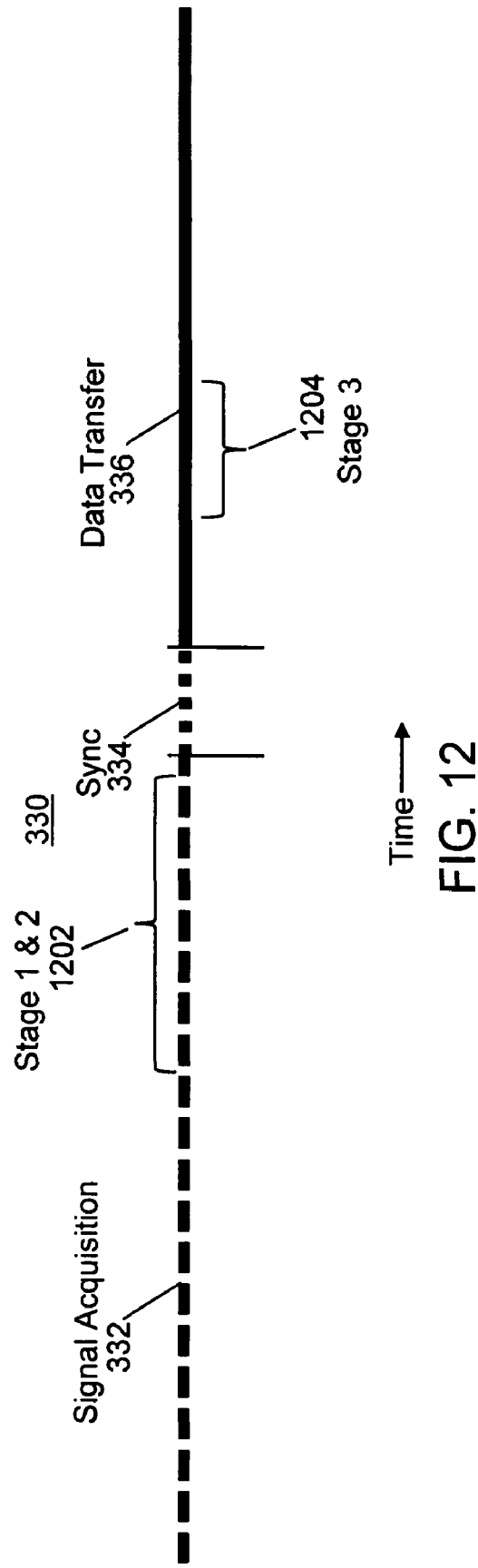

ENHANCED SYSTEM AND METHOD FOR DETECTING THE LEADING EDGE OF A WAVEFORM

CROSS-REFERENCE TO RELATED APPLICATIONS

This U.S. Non-Provisional patent application claims priority to U.S. Provisional Patent Application No. 60/924,301, filed May 8, 2007, which is incorporated herein by reference in its entirety.

FIELD OF THE INVENTION

The present invention relates generally to a system and method for detecting the leading edge of a waveform. More particularly, the present invention relates to a system and method for detecting the leading edge of an ultra wideband (UWB) waveform by sampling at a band limited Nyquist rate that avoids aliasing within a band of interest, but allows aliasing outside of the band of interest.

BACKGROUND OF THE INVENTION

Precise leading edge detection is crucial for providing accurate ranging results in multipath fading channels. The IEEE.802.15.4a standard specifies an ultra wideband physical layer (PHY) that allows for high throughput communications with a precision ranging capability (within 1 meter accuracy) and low power usage. The highly dispersive nature of ultra wideband (UWB) channels make time-of-arrival (TOA) estimation extremely challenging, where detection of the leading edge corresponding to the direct path between a transmitter and a receiver may be very difficult.

Prior art approaches to leading edge detection typically require sampling a received ultra wideband signal over 1000 times and processing the samples using relatively slow software applications that result in slow ranging and high power consumption because the transmitted ultra wideband signal must be sampled over a long period of time.

It is desirable to have an improved system and method for detecting the leading edge of a waveform that reduces the transmit time of a transmitter to decrease power consumption, reduces the processing requirement for ranging and radar applications, and reduces turnaround time in half-duplex systems.

SUMMARY OF THE INVENTION

Briefly, the present invention is an improved system and method for detecting the leading edge of a waveform for ranging and radar applications. More specifically, the invention relates to detecting the leading edge of an ultra wideband waveform. The invention requires locking to the ultra wideband waveform at a lock reference time during an acquisition period, and sampling the ultra wideband waveform during one or more time windows relative to the lock reference time to identify one or more leading edge candidate times based on one or more detection criterion. The ultra wideband signal is sampled at a band limited Nyquist rate that avoids aliasing within a band of interest of the ultra wideband waveform, but allows aliasing outside of the band of interest to minimize the number of samples for leading edge detection processing.

According to some of the more detailed features of the invention, the earliest of the one or more leading edge candidate times is determined to be that of the leading edge of the ultra wideband waveform. In one embodiment, sampling information, e.g., sample amplitudes, are transmitted on a data payload portion of an information packet for further processing. The one or more detection criterion can be based on noise information derived during the acquisition period. Such noise information can be derived from parallel correlation of the ultra wideband signal with an acquisition code during the acquisition period. In addition, the one or more detection criterion can be based on the signal strength and the acquisition code's main lobe to side lobe ratio. The impacts of the acquisition code's side lobe corruption can be removed by changing the channel code that was used during the acquisition period.

According to other more detailed features of the invention, a sampling envelope is calculated according to an envelope equation, where the one or more detection criterion is based on the sampling envelope and noise information. The sampling of the ultra wideband waveform can comprise parallel sampling of the ultra wideband waveform at two or more time instances, a first (I) instance and a second (Q) instance. The first (I) instance and second (Q) instance are spaced in time based on the center frequency associated the ultra wideband waveform, e.g., one quarter of the center frequency. The envelope equation can be the common form of the Pythagorean Theorem of the square root of the sum of the squares of the first (I) instance and the second (Q) instance. However, this can be closely approximated using simple binary logic by adding the weighted sum of the absolute values of the samples taken at the first (I) instance and second (Q) instance and the weighted difference of the absolute values of samples taken at the first (I) instance and second (Q) instance. The weightings can be implemented using a sum of bit shifts, thus allowing implementation without the complications of multiplications, divisions or square roots.

According to still other more detailed features of the invention, the ultra wideband waveform is sampled during one or more initial time windows relative to the lock reference time to establish a detection criterion to identify one or more leading edge candidate times. The ultra wideband waveform is also sampled during one or more scan time windows preceding at least one of the one or more initial time windows based on a second detection criteria to identify one or more leading edge candidate times. In an exemplary embodiment, the one or more initial and scan time windows are within an acquisition period. Moreover, at least one of the one or more leading edge candidate times is verified by sampling the ultra wideband waveform during a time window that is relative to the leading edge candidate time being verified. At least one of the one or more leading edge candidate times are verified during a header portion of an information packet. If none of the one or more leading edge candidate times is verified, the reference lock time is selected as the earliest leading edge candidate time.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 3a depicts an exemplary simplified timeline of an ultra wideband signal from a transmitter's perspective;

FIG. 3b depicts an exemplary timeline of an exemplary ultra wideband signal reception process from a receiver's perspective;

FIG. 6a depicts consecutive bistatic radar waveform scans having different lock reference times that produces a timing error;

FIG. 6b depicts proper alignment of the consecutive bistatic radar waveforms;

FIG. 7 depicts an exemplary region of interest within a received ultra wideband waveform;

FIG. 8a depicts an exemplary sampling approach where samples are uniformly spaced;

FIG. 8b depicts an alternative exemplary sampling approach involving in phase (I) and quadrature phase (Q) sampling pairs;

FIG. 10a depicts an exemplary scan window about a lock reference time of a received ultra wideband waveform;

FIG. 10b depicts sampling of an ultra wideband waveform using IQ sampling pairs;

FIG. 12 depicts the relative timing of the three stages of the exemplary coarse direct detection algorithm;

DETAILED DESCRIPTION OF THE INVENTION

Figure 1B:
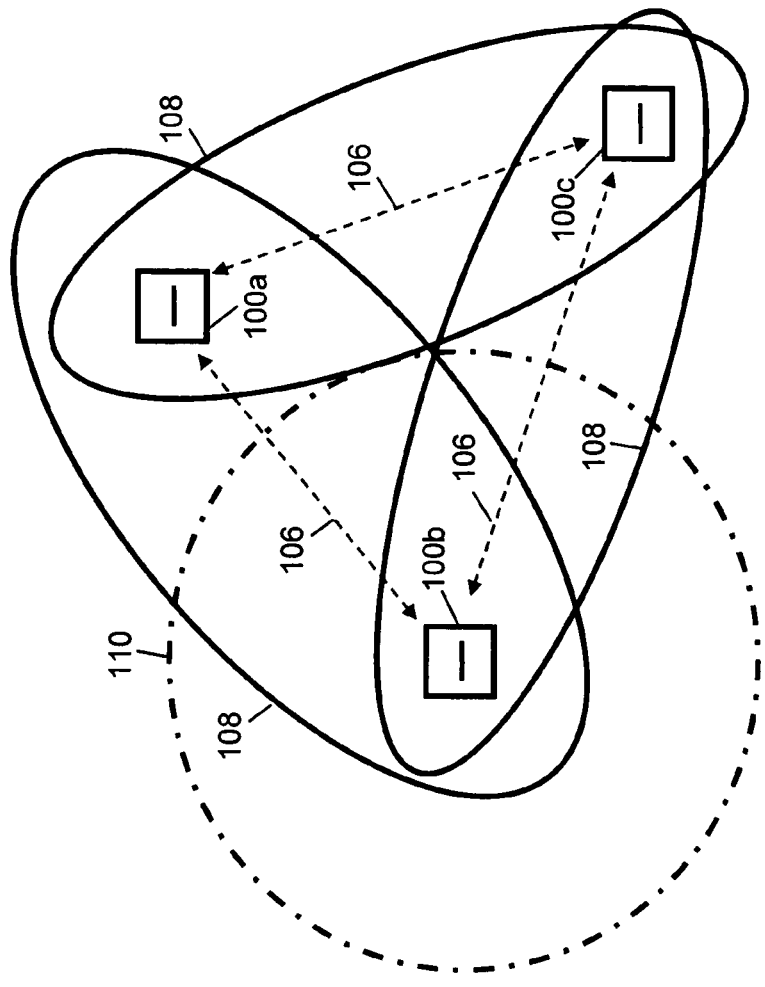
FIG. 1b depicts an exemplary configuration of three ultra wideband sensor devices using monostatic and bistatic radar techniques to monitor an area.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art. Like numbers refer to like elements throughout.

The present invention provides a system and method for detecting the leading edge of a received ultra wideband waveform. Specifically, the present invention can be used in place of or to augment current leading edge detection approaches by identifying one or more candidate leading edge times by sampling at a band limited Nyquist rate that avoids aliasing within a band of interest, but allows aliasing outside of the band of interest. Although a typical, uniformly spaced waveform could be used, the present invention uses a significantly smaller scan of the received waveform thereby requiring less signal time on the air for data collection and greatly reducing processing requirements. Less signal time on the air corresponds to increased signal capacity and reduced signal detectability, as well as enabling longer battery life. Reduced processing requirements enable longer battery life, the ability to apply correction factors more easily and, for half-duplex ranging applications, less open loop drift time that injecting timing errors. An ultra wideband waveform is also referred to herein as an ultra wideband signal. Exemplary prior art leading edge detection systems and methods that could be used in conjunction with the present invention are described in U.S. Pat. Nos. 6,762,712 and 6,963,727, which are both incorporated herein by reference.

The concept of the present invention is to have an ultra wideband radio's hardware and/or firmware perform a rapid search at a band-limited Nyquist rate as part of coarse direct detection (CDD) process. A band-limited Nyquist approach means collecting samples at intervals related to the transmitted pulse width, thus avoiding aliasing within the band of interest, but allowing aliasing both above as well as below the band of interest. In one exemplary embodiment, pair samples are collected at a first (I) instance and a second (Q) instance of in-phase and quadrature phase (i.e., I and Q). The I and Q samples in this case are not a conventional pair of mixers fed by a sine wave and a cosine wave, but instead are time domain samples separated by a time delay corresponding to approximately a quarter wavelength of the center frequency of the transmitted UWB waveform. This sampling approach has a much coarser step and requires less integration then prior art approaches, particularly radar algorithms that use more samples to maximize clutter rejection. This coarse sampling approach enables the equivalent performance of scanning specific time windows of interest with a reduced number of samples. A reasonable reduction is an order of magnitude of samples for applications such as cooperative tracking and bistatic radar trip-line detection.

The I and Q samples are used to calculate the envelope of the received waveform. Although the square root of the sum of squares is the correct calculation for an ideal sinewave, the square and square root functions are particularly problematic to implement in logic gates. An improved equation adds a term based on the absolute value of the difference of the absolute values to greatly improve the reliability when operating with a marginal signal-to-noise ratio (SNR). The weighting of the sum of absolute values and the absolute value of the differences of absolute values can be implementing using a sum of bit shift, thus being more logic friendly. This envelope approximation equation could be improved even more by adjusting the coefficients based upon the separation of the most significant one of the I and Q samples, but this is a significant complication in implementation while yielding only about 0.1 dB less error. This may be a worthwhile design approach in future implementations of the present invention.

The CDD process (or algorithm) has been broken into three stages: 1) Initialization, 2) Scan, and 3) Verification. These stages are performed after the link has been acquired and is being tracked. The initialization collects data about the lock reference time in order to initiate the variables including the first potential candidate and the CDD detection threshold. The Scan stage then quickly steps earlier in time collecting I and Q samples to process the envelope and adjust the threshold as needed. During the scan process, the time delay and magnitude of several direct signal candidates are monitored. Keeping the 6 to 8 earliest detections as candidates is sufficient to reliably capture the desired signal at the range of marginal signal to noise ratio. The verification stage then revisits these candidates and retests them for detection. The reliability is increased by verifying the CDD candidates multiple times and using a higher order verification criterion such as an M of N filter technique. Direct signal candidates are also referred to herein as candidate leading edge times.

Although the algorithm is quite reliable, over-all system reliability may be increased by leveraging CDD metrics. Specifically, the CDD candidate list can be exploited by using the relative time delay and/or magnitudes to compare to prior CDD measurements to develop a CDD quality measurement.

Figure 1A:
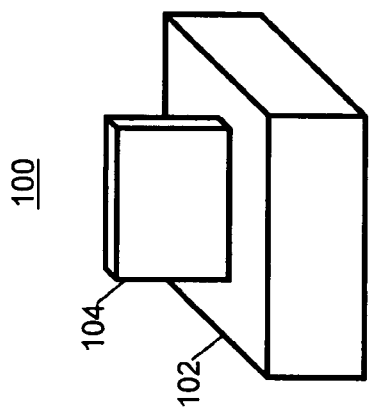
FIG. 1a illustrates an exemplary ultra wideband sensor device.

FIG. 1a illustrates an exemplary ultra wideband sensor device having communications, ranging, monostatic radar and bistatic radar functionality.

Referring to FIG. 1, an ultra wideband sensor device 100 comprises a housing 102 within which resides RF circuitry, and an antenna 104 used to transmit and/or receive ultra wideband signals.

FIG. 1b depicts an exemplary configuration of three ultra wideband sensor devices 100a, 100b, and 100c using monostatic and bistatic radar techniques to monitor an area. Various systems and methods for monitoring an area using ultra wideband devices are described in U.S. Pat. Nos. 4,743,906, 5,361, 108, 5,812,081, 6,177,903, 6,218,979, and 6,614,384, which are each incorporated herein by reference. The depicted ultra wideband sensor devices 100a, 100b, and 100c, may determine their relative locations using ultra wideband position determination techniques. Such techniques may include, for example, round trip time-of-flight distance determination techniques like those described in U.S. Pat. Nos. 6,111,536 and 6,133,876, which are incorporated herein by reference. Referring to FIG. 1b, ultra wideband sensor devices 100a, 100b, and 100c communicate by transmitting and receiving ultra wideband signals (or waveforms) via wireless links 106. The three ultra wideband sensor devices 100a, 100b, and 100c are shown working in pairs to operate as bistatic radars, where signals are transmitted by one sensor of each pair and reflections (i.e., forward scattering signals) off a target at a detection range 108 (shown as an ellipse) are received by the other sensor of each pair. Ultra wideband sensor 100b is shown also operating in a monostatic radar mode, where signals are transmitted and reflect off a target at a detection range 110 (shown as a circle) and the reflections (i.e., backscatter signals) are received by the sensor and used to determine the presence, movement, and various other characteristics (e.g., size) of a target.

Figure 2:
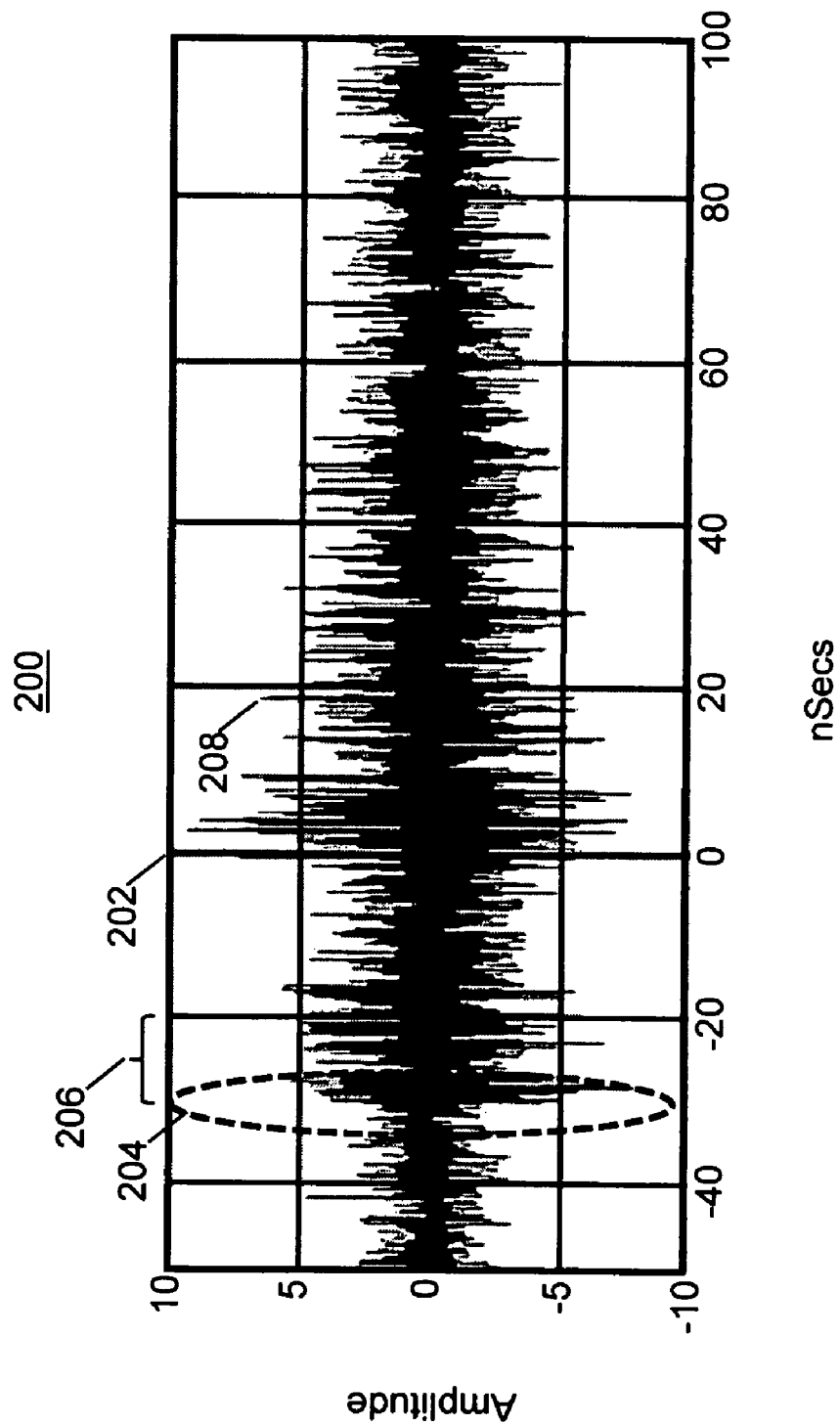
FIG. 2 depicts an exemplary received ultra wideband waveform.

FIG. 2 depicts an exemplary received ultra wideband waveform 200 as might be received by any one of the ultra wideband sensor devices 100a, 100b, or 100c over a link 106. The ultra wideband sensor device receiving the signal will acquire and lock onto the signal at a lock reference time (or lock spot) 202 typically determined based on an acquisition acceptance criteria. The received waveform 200 typically consists of a direct path ultra wideband signal (i.e., a signal having traveled directly from a transmitting device to a receiving device) and multiple indirect path ultra wideband signals corresponding to reflections off of objects near the transmitting and receiving devices. As such, one skilled in the art will recognize that the received ultra wideband waveform corresponds to a multipath response signal. The location in time of the direct path signal within the received ultra wideband waveform 200 is commonly referred to as the leading edge although a direct path may not exist between two ultra wideband sensor devices, in which case the leading edge would instead correspond to the shortest indirect path. Ideally, the leading edge can be detected using some detection criteria relative to the noise floor preceding it. As shown by the dashed oval 204 in FIG. 2, the leading edge may have a very discernable difference in amplitude to the noise preceding it. However, it is beneficial to also have the detection criteria to be a function of the signal strength in order to mitigate false detection on intersymbol interference from preceding pulses. In accordance with the present invention, it is desirable to identify a region of interest 206 that can be scanned to identify the leading edge signal as opposed to scanning an entire received ultra wideband signal. A different lock reference time can be locked on during signal acquisition, for example alternative lock reference time 208. A region of interest 206 is also referred to herein as a window, a time window, or a scan window.

FIG. 3a depicts an exemplary simplified timeline 300 of an ultra wideband signal process from the transmitter's perspective. Referring to FIG. 3a, which is not to scale, the timeline 300 has three periods, a signal acquisition period 302, a synchronization period 304, and a data transfer period 306. Generally, in accordance with the present invention, a first ultra wideband device must acquire the signal of a second ultra wideband device, the first and second devices synchronize, and then data is transferred. The data transferred may be used for ranging (i.e., distance determination) or may be radar scan information used to detect a person or an object (i.e., a target).

FIG. 3b depicts an exemplary timeline 330 of an exemplary ultra wideband signal reception process, which directly corresponds to the timeline 300 depicted in FIG. 3a. Referring to FIG. 3b, which is not to scale, the timeline 330 begins with the receiver powering-on 332. After a gain control stage 334, a link acquisition search 336 begins. When a detection threshold is attained 338 a post detection ramp 340 is built to verify link acquisition is successful. If the ramp builds successfully, the tracking loop is closed 342; otherwise, the acquisition search is resumed. Excess acquisition code 344 is typically available but may be used if needed. A delimiter 346 is then used to time synchronize the receiver with the transmitter after which a post-delimiter settling time 348 is provided. Thereafter, a PHY header 350 is used define what is provided in a first data payload (with scan) 352 and in a second optional data only payload 354. In the exemplary system, the channel code changes at the beginning of the payload to remove correlation main lobe and side lobe errors for leading edge detection criteria according to the present invention.

Figure 4A:
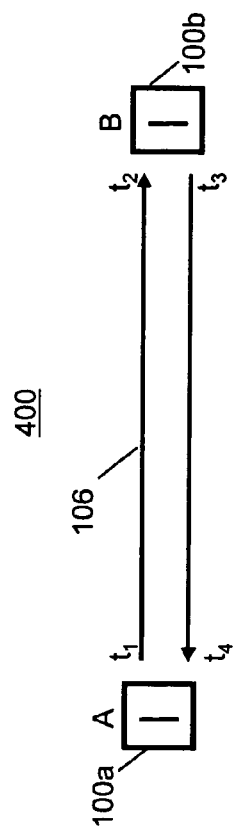
FIG. 4a depicts an exemplary round trip time-of-flight distance measurement process between two ultra wideband sensor devices in a half duplex configuration.

FIG. 4a depicts an exemplary round trip time-of-flight distance measurement process 400 between two ultra wideband sensor devices. Referring to FIG. 4a, a first ultra wideband sensor device 100a (i.e., Device A) and a second ultra wideband sensor device 100b (i.e., Device B) communicate with each other using a duplex (i.e., two way) UWB wireless link 106. Device A transmits a first UWB signal at time $t_1$ that is received by Device B at time $t_2$. Device B transmits a second UWB signal that is the same as the first UWB signal at time $t_3$, where $t_3$ is to occur a predetermined amount of time after receiving the signal at time $t_2$. Device A receives the UWB signal sent by Device B at time $t_4$. A (round trip) time-of-flight equation is then used to calculate the time it takes a signal to travel between the two devices. This time-of-flight is then used to calculate the distance between the two devices. Because each of the two devices transmits and receives substantially the same signal they can achieve substantial time synchronization using the respective delimiters of their received UWB signals provided they each account for the time between their lock reference time and the leading edge of the receive UWB waveforms. Otherwise, differences in their lock reference times would correspond to a timing error. In other words, the round trip time-of-flight calculation is made more accurate when Device B accounts for an error correction factor ECB that corresponds to the difference in time between its lock reference time and the leading edge of the UWB signal it receives, and Device A also accounts for an error correction factor ECA that corresponds to the difference in time between its lock reference time and the leading edge of the UWB signal it receives.

Figure 4B:
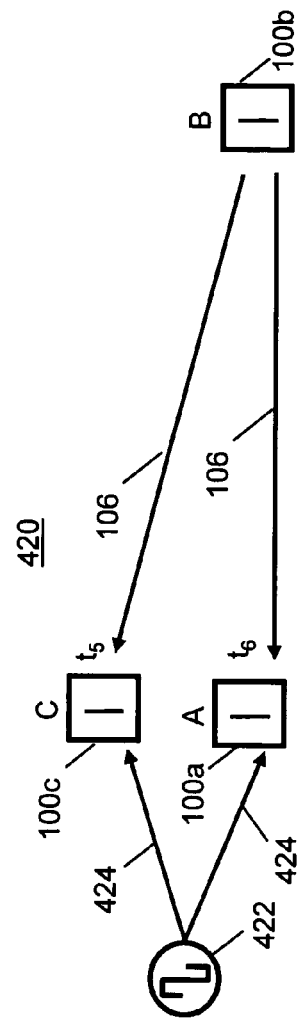
FIG. 4b depicts an exemplary time difference of arrival measurement or an angle of arrival measurement from an ultra wideband transmit only device to two ultra wideband receivers that are synchronized.

FIG. 4b depicts an exemplary time difference of arrival distance measurement process 400 between two ultra wideband sensor devices. Referring to FIG. 4b, a first ultra wideband sensor device 100a (i.e., Device A) and a second ultra wideband sensor device 100c (i.e., Device C) receive signals from a third device 100b (i.e., Device B) using a simplex (i.e., one way) UWB wireless link 106. Device A and Device C have been synchronized by a common timing device 422 from which they receive a synchronization signal 424. Device A measures the time of arrival of the signal from Device B at time $t_6$, while Device C measures the time of arrival of the signal from Device B at time $t_5$. Before using the two arrival times in time difference of arrival (or angle of arrival calculations), each receiver must account for the time between their lock reference time and the leading edge of their received UWB waveforms.

Figure 5:
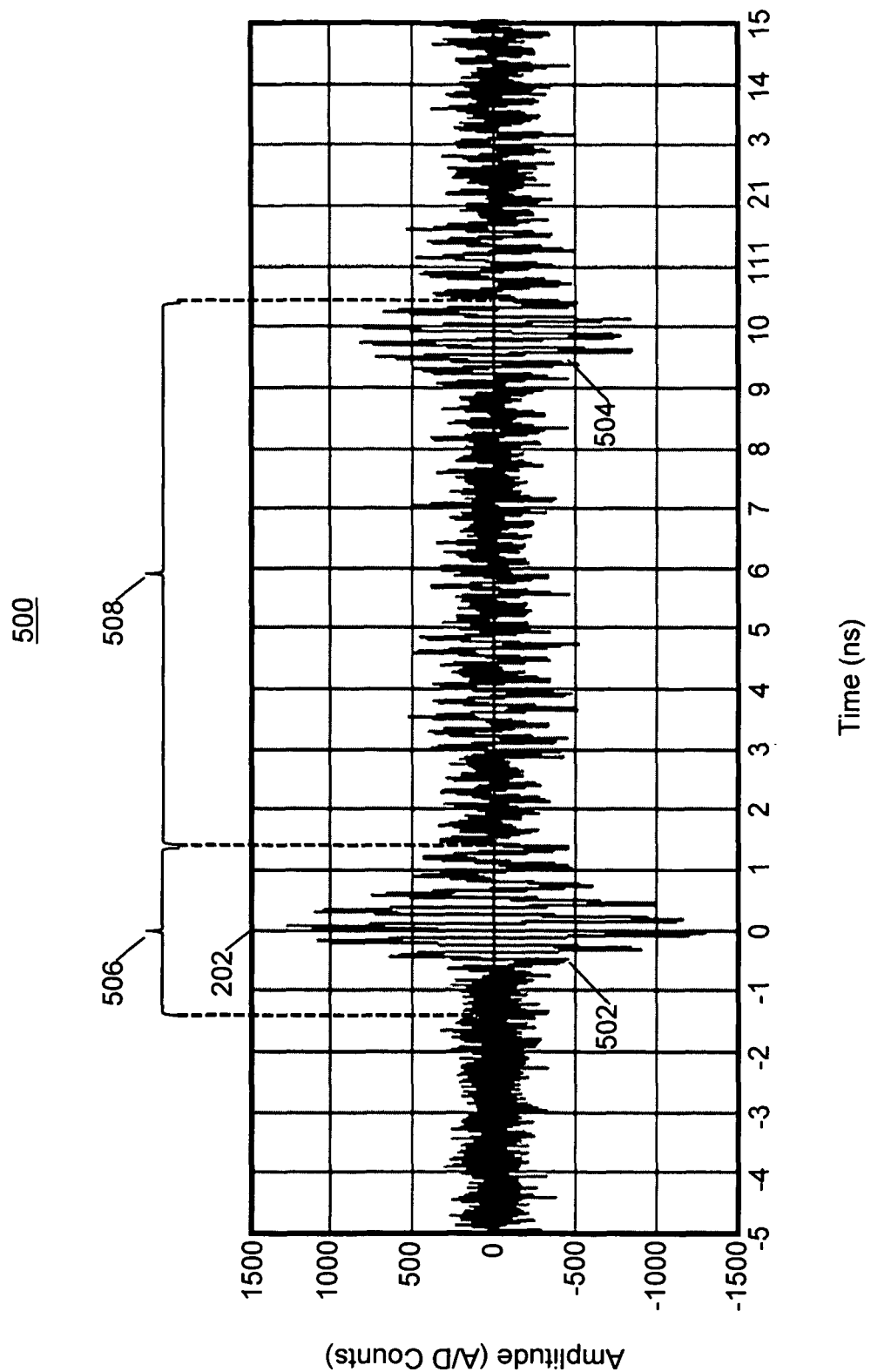
FIG. 5 depicts an exemplary received ultra wideband bistatic radar waveform.

FIG. 5 depicts an exemplary received ultra wideband bistatic radar waveform 500. Referring to FIG. 5, the received ultra wideband bistatic radar waveform includes a first signal portion 502 corresponding to the direct signal transmitted from a first ultra wideband signal device and received by a second ultra wideband sensor device along with associated multipath signals. The received ultra wideband bistatic radar waveform 500 also includes a second signal portion 504 corresponding to the reflection off a target of the signal transmitted from the first ultra wideband signal device and received by the second ultra wideband sensor device along with associated multipath signals. The second ultra wideband device can acquire the ultra wideband bistatic radar waveform 500 by locking onto a lock reference time 202 that may reside in either the first signal portion 502 or the second signal portion 504. Also shown in FIG. 5 are an alignment window 506 and a trip-line window 508.

FIG. 6a depicts consecutive bistatic radar waveforms aligned using different lock spots, which produces a timing error. Referring to FIG. 6a, misaligned bistatic radar waveforms 600 consist of a first bistatic radar waveform 602 having a first lock time reference and a second bistatic radar waveform 604 having a second lock time reference. The difference between the two lock time references corresponds to a timing error 608 that can be seen when the two waveforms are aligned in accordance with their lock time references 606.

FIG. 6b depicts proper alignment of the consecutive bistatic radar waveforms. Referring to FIG. 6b, aligned bistatic radar waveforms 610 consist of a first bistatic radar waveform 602 and a second bistatic radar waveform 604 aligned in accordance with their leading edges 612. As such, FIGS. 6a and 6b depict the timing error resulting from waveforms being locked at different locations that can be corrected by shifting their reference times to their leading edges. When comparing such waveforms, which typically means subtracting one from the other, it is necessary that they be correctly aligned.

FIG. 7 depicts an exemplary region of interest within a received ultra wideband waveform. Referring to FIG. 7, an exemplary received ultra wideband waveform 700 has a lock time reference 702 that in one embodiment of the present invention takes place during the signal acquisition period. In accordance with the present invention, it is desirable to identify one or more candidate leading edge times 704 that can be used to define a region of interest 706 (also referred to as a window, scan window, or scan region), where the leading edge is likely to be detected. In this way, the region of interest 706 can then be sampled or otherwise scanned to determine or verify the leading edge of the received ultra wideband waveform 700.

FIG. 8a depicts an exemplary sampling approach 800 where samples are uniformly spaced. Referring to FIG. 8a, a received ultra wideband waveform 802 is sampled in accordance with a uniformly spaced timeline where corresponding samples 806 are indicated by an 'X'. In order to reduce the number of samples taken, in one embodiment of the invention, the waveform 802 is sampled at a band limited Nyquist sampling rate that avoids aliasing within a band of interest and allows aliasing outside of such band, thereby minimizing the required number of samples for calculating an envelope that is used for setting one or more leading edge detection criterion. Such sampling is sometimes referred to as coarse sampling because it involves taking just enough samples for calculating the waveform envelope. In one exemplary embodiment, the band limited Nyquist rate is substantially equal to $1/(2f_{max})$, where $f_{max}$ is the highest frequency in the original signal. Alternatively, the waveform could be sampled at a rate higher than the Nyquist sampling rate (i.e., oversampled) or sampled at a rate lower than the Nyquist sampling rate (i.e., undersampled) as long as a sufficiently reduced number of samples are taken to create an envelope for accurate leading edge detection. Sampling of the received waveform as described herein actually corresponds to sampling of many essentially identical UWB waveforms arriving at a receiver over a very short period of time. For example, UWB devices may transmit and receive millions of UWB waveforms per second. At such speeds, the characteristics of the waveforms resulting from the environment (e.g., multipath) do not substantially change from one transmitted waveform to another since the environment does not noticeably change at such speeds. Moreover, sampling a single point may, in accordance with the present invention, correspond to sampling the same location of many consecutive waveforms and integrating the sampled values, which correspond to output of one or more samplers sampling the waveform at the desired sample locations. This integration process is sometimes referred to herein as 'building ramps' or 'building integration ramps'.

FIG. 8b depicts an alternative exemplary sampling approach 810 involving in phase (I) and quadrature phase (Q) sampling pairs. Referring to FIG. 8b, a received ultra wideband waveform 802 is sampled in accordance with a timeline 812 and corresponding IQ pairs 814. The I and Q samples 806 are separated by an amount of time 816 corresponding to one quarter of the inverse of the center frequency of the transmitted UWB signal and the time between consecutive IQ pairs 818 corresponds to half the inverse of the bandwidth of the transmitted signal. For example, for an UWB signal having a 4 GHz center frequency and a 1 GHz bandwidth, the IQ spacing is approximately 62.5 picoseconds and the time between each I and Q pair sample of each IQ pair is approximately 0.5 ns coarse sampling spacing corresponding to a band limited Nyquist rate according to an exemplary embodiment of the invention. One skilled in the art will recognize that many different sampling techniques can alternatively be used in accordance with the present invention.

Figure 9:
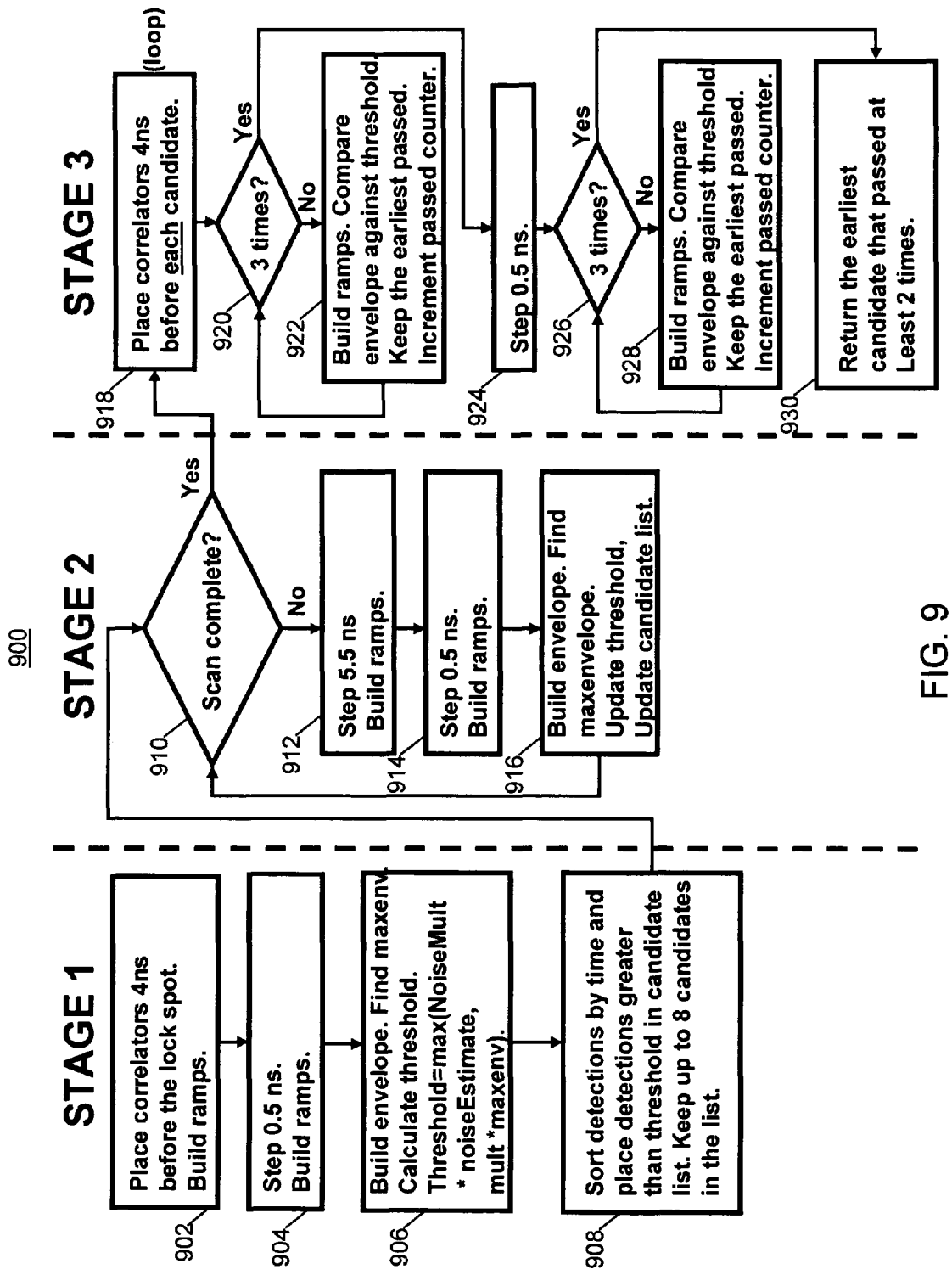
FIG. 9 depicts a flow chart of an exemplary three stage coarse direct detection algorithm in accordance with the present invention.

FIG. 9 depicts a flow chart 300 of an exemplary three stage coarse direct detection (CDD) algorithm in accordance with the present invention. The CDD algorithm comprises three stages referred to herein as Stage 1 (Initialization), Stage 2 (Scan), and Stage 3 (Verification). Stage 1 is used to scan the waveform near the lock reference time (e.g., 5 ns). If Stage 1 is performed during acquisition, the same scan/sampling can also provide information corresponding to the previous two periods of the waveform by performing a code convolution in parallel. Based upon the Stage 1 scan(s), an initial threshold value is established as well as an initial list of candidate leading edge times, which are also referred to as CDD candidates. In one exemplary embodiment, Stage 2 is used to scan (e.g., 150 ns) the envelope of the waveform using IQ sampling pairs, adjusting the threshold value as needed in order to find the best CDD candidates, and to add them to a candidate list, where they are sorted and only a certain desired number (e.g., six) of the earliest candidates (in time) are passed to Stage 3. If Stage 2 is performed during the acquisition preamble, the parallel code convolution can simultaneously scan multiple period (e.g., three). In Stage 3, scans are performed of time windows (e.g., 5 ns) about each of the selected earliest candidates. Such scans may be performed using a coarse sampling approach such as the IQ sampling approach performed during State 1 and 2 or may be of higher resolution in which case they may produce new candidates due to the higher resolution (or finer) scanning used. Generally, Stage 3 searches the windows of the selected earliest candidates until the earliest detection in the window corresponding to the earliest verified candidate has repeatedly (e.g., 2 out of 3 times) met a verification criterion, for example, passed a threshold test, and is therefore determined to be the leading edge (i.e., the best overall candidate or CDD). If a fine sampling is used, exploiting the oversampling can be used as opposed to multiple scans. The CDD location and metrics are then passed on to application software for use in further processing of the signal, etc.

Referring to FIG. 9, Stage 1 comprises four steps. In a first step 902, samplers (spanning a 5 ns window) are placed 4 ns before the lock reference time (or lock spot) and integration ramps are built. In a second step 904, the samplers are moved 0.5 ns and additional ramps are built. In a third step 906, the ramp outputs are used to build an envelope of the window corresponding to the lock reference time. The maximum envelope value is determined. An initial threshold value is determined to be the maximum of a noise-based threshold or an envelope based threshold. In a fourth step 908, detections greater than the threshold are sorted by time in a list, where only the earliest 8 (or some other desired maximum number of) candidates are maintained in the list.

Stage 2 comprises four steps. In a first step 910, a determination is made as to whether the Stage 2 scan is complete, which occurs when the Pulse Repetition Interval (PRI) window has been scanned. Otherwise, in step 912 the scan locations are moved earlier relative to the lock reference time and integration ramps are built. In step 914, the scan locations are again moved earlier relative to the lock reference time and additional integration ramps are built. With each scan iteration, in step 916, an envelope for the scan and a maximum envelope value is determined, the threshold is updated as necessary, and the candidate list is updated to maintain the desired number of earliest candidates meeting the (possibly updated) threshold.

Stage 3 comprises seven steps that are repeated for each candidate in the candidate list and is intended to scan a window about each given candidate. The first step 918 is to position samplers at the beginning of the candidate window. A step 920 determines whether ramps have been built a desired number of times (e.g., three) for each of the samplers. In step 922, ramps are built for each sampler, the envelope is compared against the threshold, and the earliest passed candidate in the window is passed to the remainder of the stage. In a fourth step 924, the location of the samplers is advanced. A step 926 determines whether ramps have been built a desired number of times (e.g., three) for each of the samplers. In step 928, ramps are built for each sampler, the envelope is compared against the threshold, and the earliest passed candidate in the window is identified. In a final step 930 the earliest candidate that has been successfully verified M of N times is passed on as the CDD result to application software.

One technique that is useful in accordance with the present invention is to change the channel code used during acquisition to a different code prior to performing Stage 3. Changing the channel coding can mitigate any coding side lobes that produced false detections during Stage 2.

FIG. 10a depicts an exemplary scan window about a lock reference time of a received ultra wideband waveform. Referring to FIG. 10a, an ultra wideband waveform 700 is locked onto at lock reference time 702, which becomes the zero (0) time reference. A scan window 1000 is shown that is selected to begin 4 nanoseconds before the lock reference time 702 and to end 1 nanosecond after the lock reference time 702. As such, the scan window 1000 is 5 nanoseconds wide.

FIG. 10b depicts sampling of an ultra wideband waveform using IQ sampling pairs, or more particularly, FIG. 10b depicts sampling of a window of a received ultra wideband waveform using IQ sampling pairs. Referring to FIG. 10b, scan window 1000 includes a waveform portion 802 of a received ultra wideband waveform 700 having a lock reference time 702 corresponding to the zero (0) time reference. As indicated by a timeline 812, the window extends from minus four nanoseconds to 1 nanosecond relative to the zero time reference. As shown in FIG. 10b, multiple samplers are used for IQ pair sampling of the waveform portion 802, where IQ pair 814 comprises two samples 806 including an I sample and a Q sample. By moving the samplers across the waveform portion 702 over time the window can be coarsely scanned according to the present invention and ramps can be built corresponding to the IQ samples across the waveform portion 802.

Figure 11A:
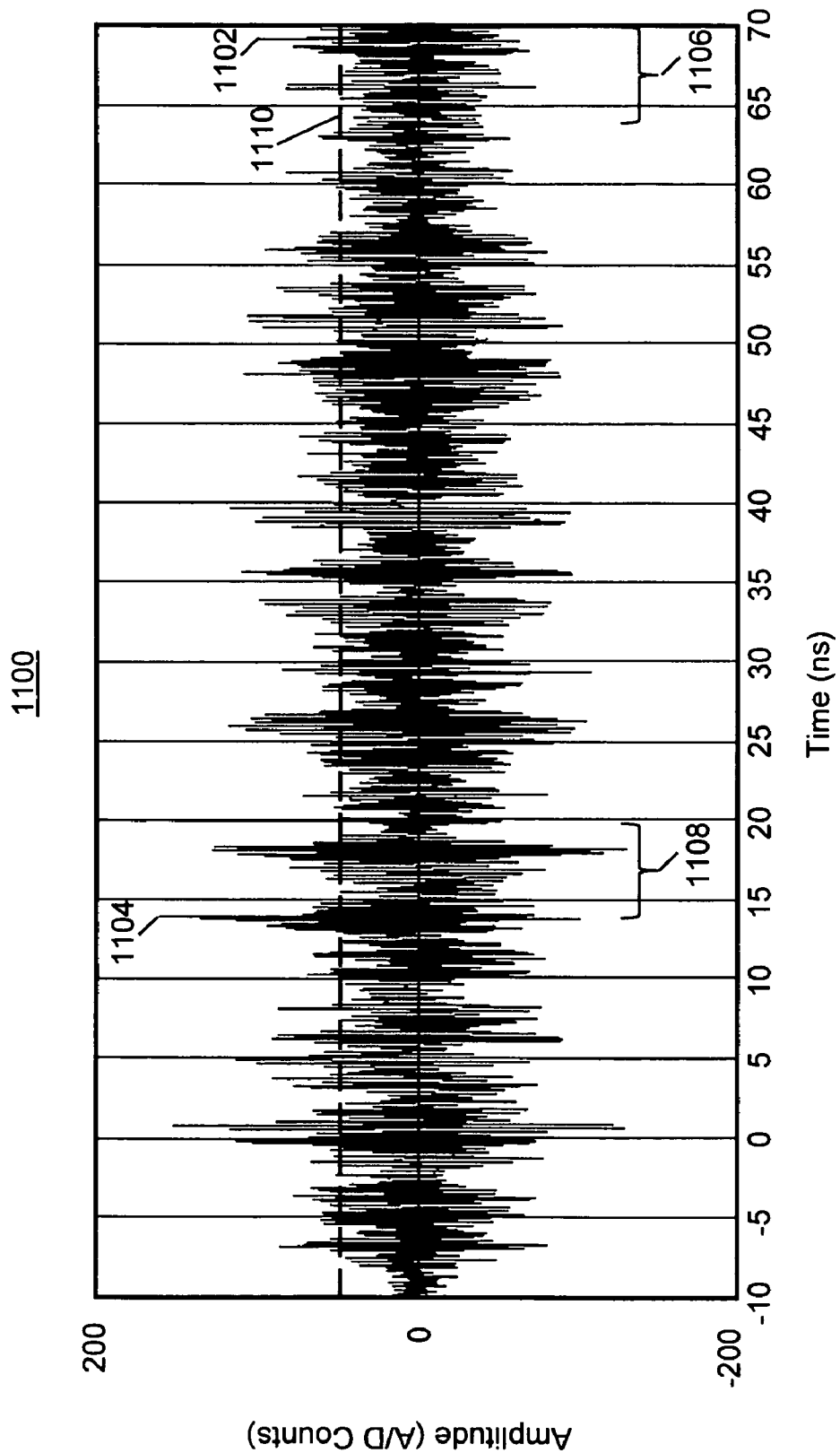
FIG. 11a depicts an exemplary initialization phase of an exemplary coarse direct detection algorithm in accordance with the present invention.

FIG. 11a depicts an exemplary initialization phase of an exemplary coarse direct detection algorithm in accordance with the present invention. Referring to FIG. 11a, a received ultra wideband waveform 1100 is locked onto at a lock reference time 1102 and has a peak amplitude 1104. A first scan window 1106 that includes the lock reference time 1102 is scanned. If initialization is allowed to continue during signal acquisition (i.e., if the signal is acquired in time such that remaining acquisition time can be used for initialization scanning) then an additional window 1108 is scanned 50 ns before the lock reference time and possibly also another window at 100 ns before the lock reference time (not shown) is also scanned. The resulting envelope(s) are then used to determine an initial threshold 1110.

Figure 11B:
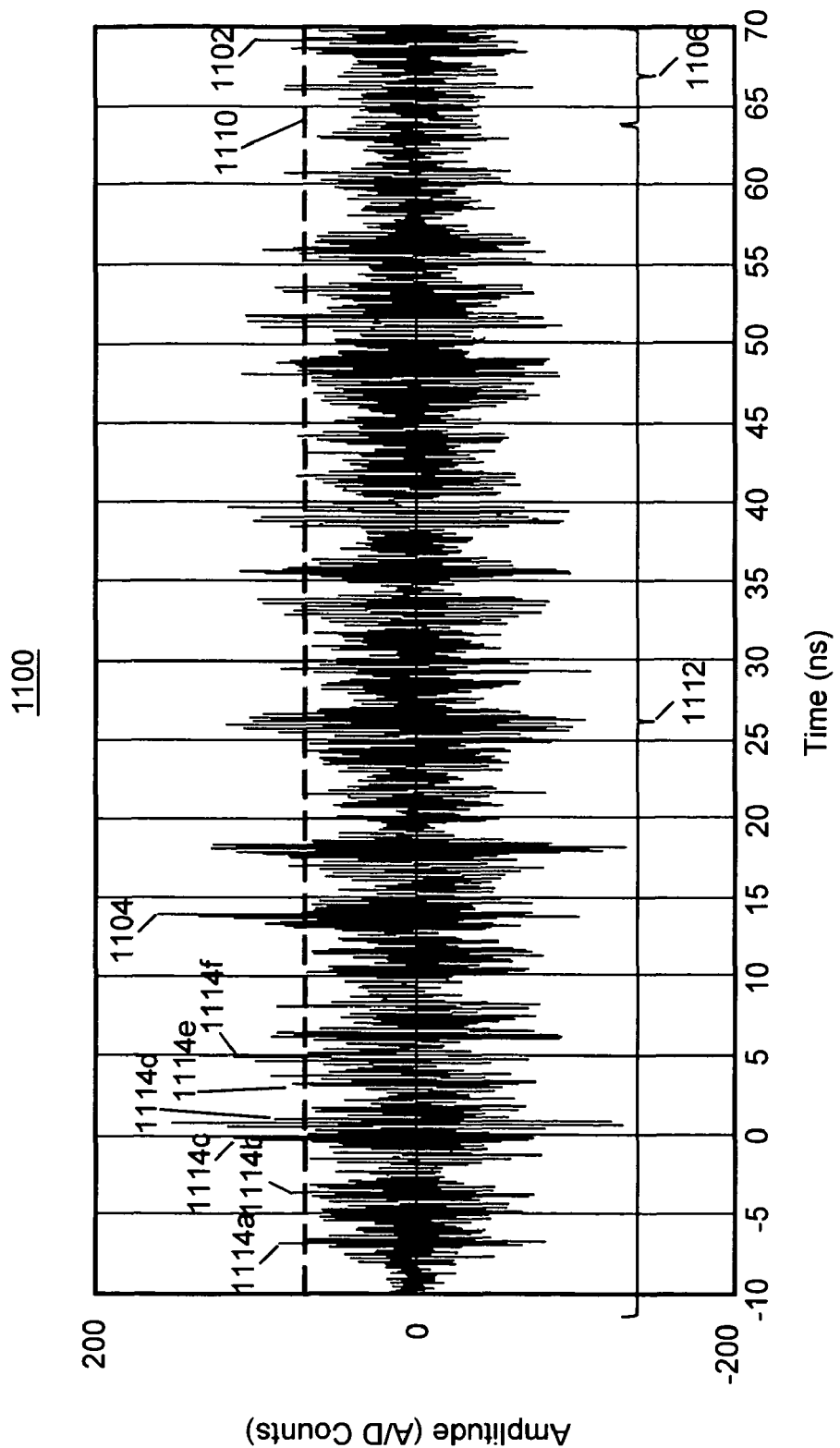
FIG. 11b depicts an exemplary scan phase of an exemplary coarse direct detection algorithm in accordance with the present invention.

FIG. 11b depicts an exemplary scan phase of an exemplary coarse direct detection algorithm in accordance with the present invention. Referring to FIG. 11b, a second scan window 1112 which begins at some selected time believed to be before the ultra wideband waveform arrives (i.e., only noise) up to the first scan window 1106. During the scan, the threshold 1110 is updated as necessary. Shown in FIG. 11b are six candidate leading edge times 1114a through 1114f remaining after the scan phase, all of which are shown located outside the first scan window 1106 and located at the beginning (i.e., left side) of the second window 1112.

Figure 11C:
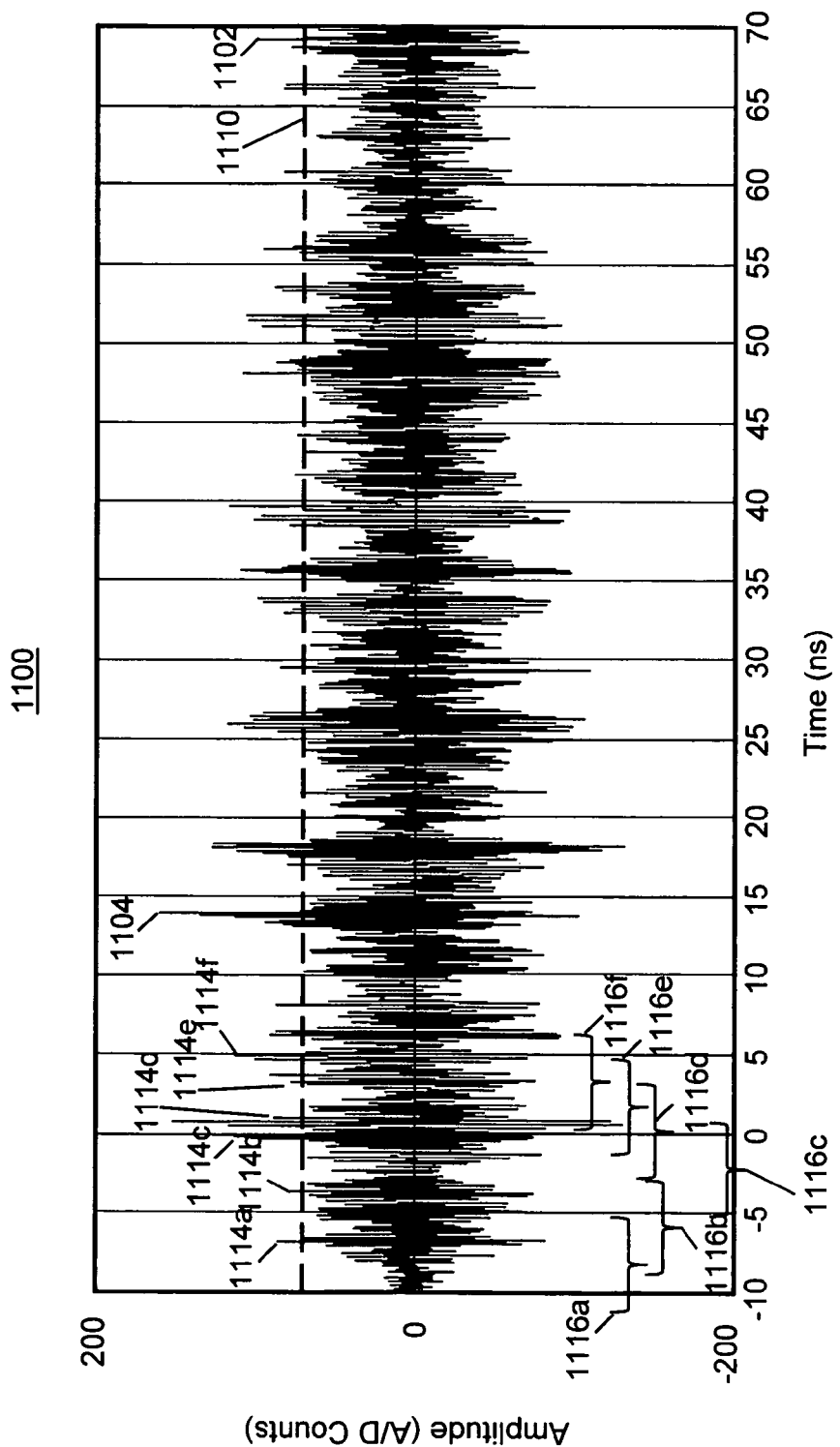
FIG. 11c depicts an exemplary verification phase of an exemplary coarse direct detection algorithm in accordance with the present invention.

FIG. 11c depicts an exemplary verification phase of an exemplary coarse direct detection algorithm in accordance with the present invention. Referring to FIG. 11c, scan windows 1116a through 1116f are shown corresponding to each of the candidate leading edge times 1114a through 1114f previously shown in FIG. 11b.

FIG. 12 depicts the relative timing of the three stages of the exemplary coarse direct detection algorithm. Referring to FIG. 12, stages 1 and 2 1202 are shown occurring during the signal acquisition period 332 and stage 3 1204 is shown occurring during the data transfer period 336. In one exemplary embodiment, Stage 1 and 2 1202 occur after signal acquisition and stage 3 1204 be completed during the header portion of the data transfer period 336 (see FIG. 3a). Depending on the speed of signal acquisition, it may be necessary or preferable that all three stages occur during the data transfer period 336.

The times and amplitudes of the candidate leading edge times can be provided to software applications as metrics, where these metrics correspond to a "thumbprint" that can be used to compare to previous "thumbprints" to assess processing results so as to determine a confidence level regarding the accuracy of signal processing.

Figure 13:
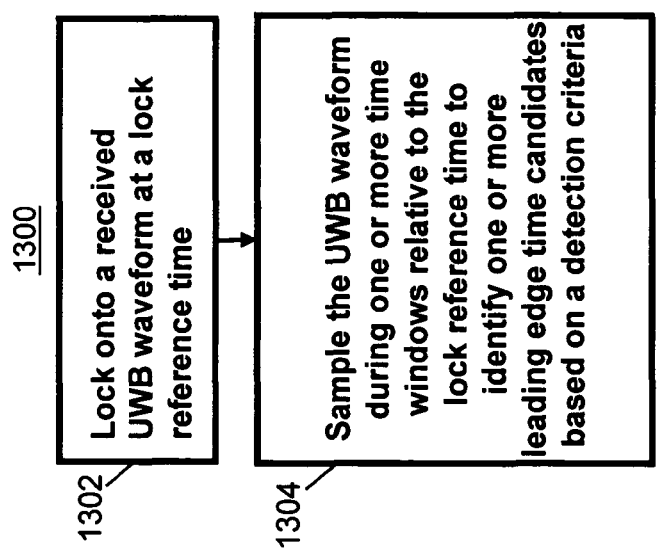
FIG. 13 depicts an exemplary method in accordance with the present invention.

FIG. 13 depicts an exemplary method in accordance with the present invention. Referring to FIG. 13, method 1300 includes a first step 1302 which is to lock onto an ultra wideband signal at a lock reference time. A second step 1304 is to sample the UWB waveform during one or more time windows relative to the lock reference time to identify one or more leading edge candidate times based on a detection criterion.

Figure 14:
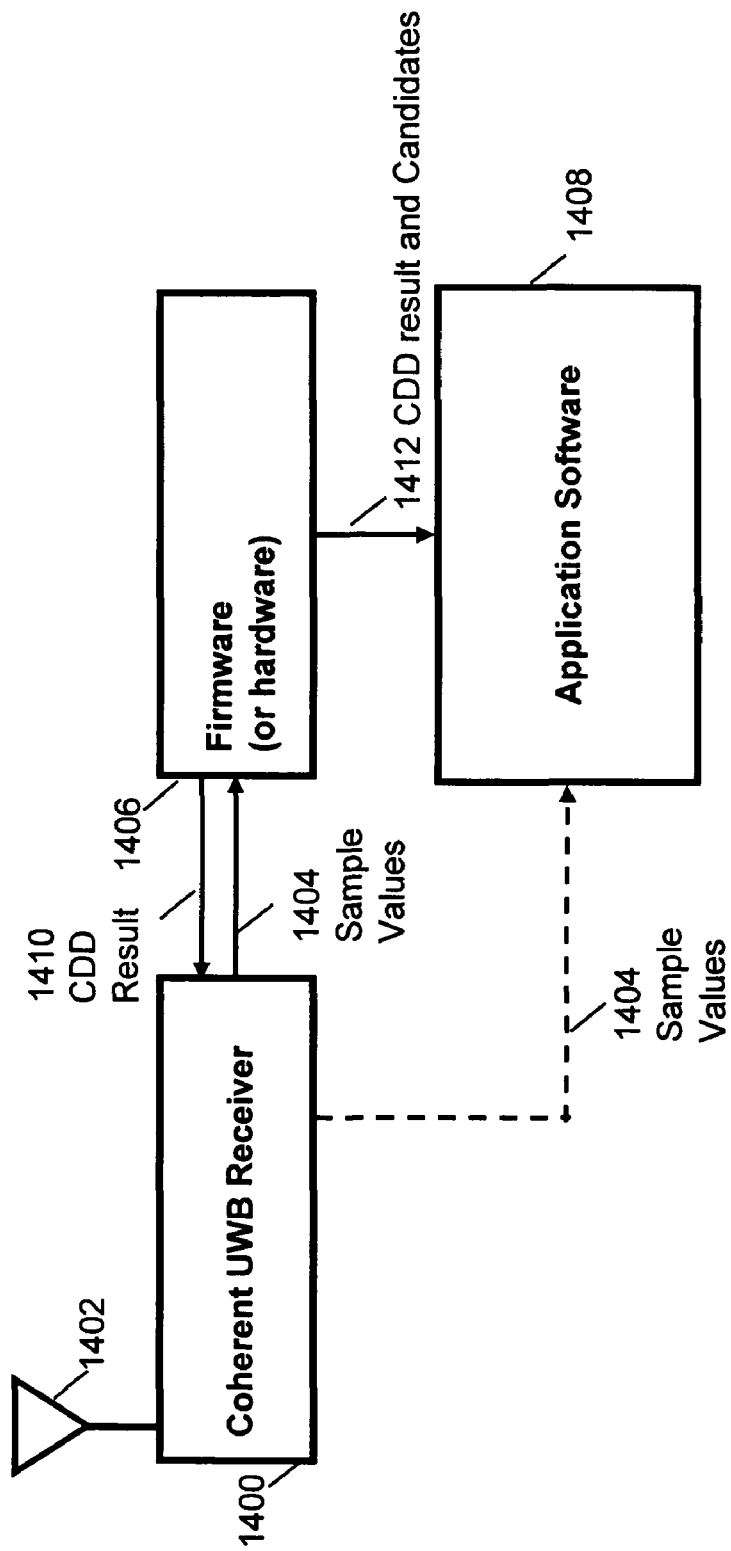
FIG. 14 depicts an exemplary system in accordance with the present invention.

The sampling of the waveforms described herein can be performed using many different ultra wideband receiver architectures. Preferably, a coherent UWB receiver such as described in patents incorporated herein can be combined with firmware (or hardware) processors dedicated to performing the CDD algorithm, as depicted in FIG. 14. Referring to FIG. 14, a coherent UWB receiver 1400 receives a UWB signal from antenna 1402, samples the signal and outputs sample values 1404 to firmware processor 1406 for Stage 1 and Stage 2 processing. The coherent UWB receiver 1400 may include multiple samplers that can be used to sample an individual received UWB signal at multiple locations. Firmware processor (or hardware) 1406 may also include parallel processing elements that can be used to process sample values more quickly. Firmware processor 1406 can also perform Stage 3 processing or such processing can be performed by application software 1408, which may be executing on a different computing platform, for example, a computer receiving data from multiple ultra wideband sensor devices and which uses their combined data to determine presence, movement, and other characteristics of persons, objects, animals, etc. within an area being monitored. Firmware processor 1406 may return a CDD result 1410 to the coherent UWB receiver and a CDD result and Candidates 1412 to application software 1408. Computing resources used to execute application software 1408 may also provide parallel processing capabilities. Such applications software may employ leading edge detection techniques that are different from the exemplary CDD verification techniques provided herein to search the windows about the candidate leading edge times determined in accordance with the present invention. Under one arrangement, dedicated firmware (or hardware) 1406 is not used and instead the present invention is managed by application software (as indicated by the dashed line between the coherent UWB receiver 1400 and application software 1408). Generally, the present invention can be practiced using many different combinations of hardware, firmware, and/or software to perform its various processing functions.

Various types of approaches for searching a waveform are described in U.S. Pat. No. 6,925,109, which is incorporated herein by reference. Although the U.S. Pat. No. 6,925,109 patent concerns correlation of a received UWB signal to different offsets of a template UWB signal and determining signal acquisition based on an acceptance criteria, for example an amplitude threshold, it generally describes various methods for searching a search space using various search schemes (or scanning processes). It also describes use of multiple search engines collaborating to work in parallel to affect such search schemes more efficiently. When provided the teaching of the invention herein, one skilled in the art will recognize that the described techniques and other well known searching techniques are generally applicable for searching for candidate leading edge times in accordance with the present invention.

While particular embodiments of the invention have been described, it will be understood, however, that the invention is not limited thereto, since modifications may be made by those skilled in the art, particularly in light of the foregoing teachings.

The invention claimed is:

1. A method for detecting the leading edge of an ultra wideband waveform, comprising:
    locking to the ultra wideband waveform at a lock reference time with a receiver;
    sampling the ultra wideband waveform with the receiver during one or more time windows relative to the lock reference time to identify one or more leading edge candidate times based on one or more detection criterion, wherein said ultra wideband signal is sampled at a band limited Nyquist rate that avoids aliasing within a band of interest of the ultra wideband waveform, but allows aliasing outside of the band of interest; and
    calculating a sampling envelope according to an envelope equation.

2. The method of claim 1, further comprising:
    determining the earliest of the one or more leading edge candidate times.

3. The method of claim 1, further comprising:
    transmitting sampling information related to the one or more time windows on a data payload portion of an information packet for further processing.

4. A method for detecting the leading edge of an ultra wideband waveform, comprising:
    locking to the ultra wideband waveform at a lock reference time with a receiver; and
    sampling the ultra wideband waveform with the receiver during one or more time windows relative to the lock reference time to identify one or more leading edge candidate times based on one or more detection criterion, wherein said ultra wideband signal is sampled at a band limited Nyquist rate that avoids aliasing within a band of interest of the ultra wideband waveform, but allows aliasing outside of the band of interest,
    wherein the one or more detection criterion are based on noise information derived during an ultra wideband signal acquisition period that results in locking to the ultra wideband signal.

5. The method of claim 4, wherein the noise information is derived from parallel correlation of the ultra wideband signal with an acquisition code during the acquisition period.

6. The method of claim 1, wherein the one or more detection criterion correspond to at least one of a received signal strength or a main lobe to side lobe ratio.

7. The method of claim 1, wherein corruption by side lobes is removed by changing a channel code used during acquisition of the ultra wideband waveform.

8. The method of claim 1, wherein the one or more detection criterion are based on the sampling envelope and noise information.

9. The method of claim 1, wherein the sampling of the ultra wideband waveform comprises parallel sampling of the ultra wideband waveform at two or more time instances.

10. The method of claim 9, wherein the ultra wideband waveform is sampled at a first (I) instance and a second (Q) instance, said first (I) instance and second (Q) instance being spaced in time based on the center frequency associated the ultra wideband waveform, and wherein the envelope equation requires the combination of samples taken at the first (I) instance and the second (Q) instance.

11. The method of claim 10, wherein the first (I) instance and the second (Q) instance are spaced according to one quarter of the center frequency.

12. The method of claim 10, wherein an envelope equation is determined by the addition of a weighted sum of the absolute values of a first (I) instance and a second (Q) instance and the weighted absolute value or the difference of the absolute values of a first (I) instance and second (Q) instance.

13. The method of claim 1, wherein the ultra wideband waveform is sampled during one or more initial time windows relative to the lock reference time to establish a detection criteria to identify one or more leading edge candidate times.

14. A method for detecting the leading edge of an ultra wideband waveform, comprising:
   locking to the ultra wideband waveform at a lock reference time with a receiver; and
   sampling the ultra wideband waveform with the receiver during one or more time windows relative to the lock reference time to identify one or more leading edge candidate times based on one or more detection criterion, wherein said ultra wideband signal is sampled at a band limited Nyquist rate that avoids aliasing within a band of interest of the ultra wideband waveform, but allows aliasing outside of the band of interest;
   wherein the ultra wideband waveform is sampled during one or more initial time windows relative to the lock reference time to establish a detection criteria to identify one or more leading edge candidate times;
   wherein the ultra wideband waveform is sampled during one or more scan time windows preceding at least one of the one or more initial time windows based on a second detection criteria to identify one or more leading edge candidate times.

15. The method of claim 14, wherein the one or more initial and scan time windows are within an acquisition period.

16. The method of claim 1, wherein at least one of the one or more leading edge candidate times are verified by sampling the ultra wideband waveform during a time window that is relative to each leading edge candidate time being verified.

17. The method of claim 16, wherein at least one of the one or more leading edge candidate times are verified during a header portion of an information packet.

18. The method of claim 16, further comprising:
   selecting the reference lock time as the earliest leading edge candidate time if none of the one or more leading edge candidate times is verified.

19. The method of claim 1, wherein a plurality of leading edge candidate times are used for determining at least one of a range or a quality factor.

* * * * *